United States Patent [19]

Nonaka et al.

[11] Patent Number: 4,757,948
[45] Date of Patent: Jul. 19, 1988

[54] PROCESS FOR PRODUCING A HIGH TOTAL DIETARY CORN FIBER

[75] Inventors: Henry H. Nonaka, Orland Park; Verl E. Headley, Willowbrook, both of Ill.

[73] Assignee: CPC International Inc., Englewood Cliffs, N.J.

[21] Appl. No.: 11,462

[22] Filed: Feb. 5, 1987

[51] Int. Cl.$^4$ .............................................. B02C 11/00
[52] U.S. Cl. ........................................... 241/7; 241/9; 241/10; 241/11; 241/24
[58] Field of Search ...................... 241/6, 7, 9, 10, 11, 241/24; 99/602, 567, 618, 621, 241

[56] References Cited

U.S. PATENT DOCUMENTS

| | | | |
|---|---|---|---|
| 1,183,573 | 5/1916 | LePage | 241/9 |
| 2,347,215 | 4/1944 | Pattee . | |
| 3,399,839 | 9/1968 | Anderson et al. | 241/11 |
| 3,446,665 | 5/1969 | Castiello et al. . | |
| 4,126,707 | 11/1978 | Hart . | |
| 4,181,534 | 1/1980 | Headley . | |
| 4,181,747 | 1/1980 | Kickle et al. . | |

Primary Examiner—Timothy V. Eley

[57] ABSTRACT

A process for producing a high total dietary corn fiber. Undried corn fiber obtained from the corn wet-milling process is separated by means of a sifter to give a coarse fiber fraction of enhanced total dietary fiber content. The coarse fiber fraction is then passed through a roller mill to give a product of even higher total dietary fiber content.

8 Claims, No Drawings

PROCESS FOR PRODUCING A HIGH TOTAL DIETARY CORN FIBER

FIELD OF THE INVENTION

This invention relates to a method wherein the mixed fiber stream obtained from the wet-milling corn process is processed to give a product having a high total dietary fiber content.

BACKGROUND OF THE INVENTION

In recent years, there has been an increasing awareness of the role that fiber plays in the human diet. This stems not only from the role that fiber plays as a bulking agent, but also from the role it is believed to play in preventing diseases of the gastrointestinal tract.

The dietary fiber from wheat, wheat bran, has been consumed in breakfast cereals, whole wheat breads, and similar products for many years. However, there is a recognized need for larger amounts of fiber to supplement processed foods which are now eaten by a large proportion of the population. For these reasons, food suppliers have sought additional sources of dietary fiber.

One potential source of dietary fiber is the corn fiber obtained as a by-product of the wet milling of corn. However, this product contains fairly high percentages of starch and protein. Such additional components make the fiber less suitable for use in baking and other food applications. This has led workers to look for an economical and commercially acceptable process to reduce the amount of starch and protein while increasing the dietary fiber content of the fiber obtained from the corn wet-milling process.

In U.S. Pat. No. 4,181,534, one process is disclosed for treating the wet fiber stream obtained from the corn wet-milling process. According to this process, the fiber stream, while still wet, is abraded by means of a beater or impact mill. The milled product is then separated into fractions with one fraction being an enriched fiber containing a high proportion of pentosans.

In U.S. Pat. No. 4,181,747, a second process is disclosed for enriching the fiber obtained from corn and soybeans. In this process, the crude fiber is heated with dilute aqueous acid to hydrolyze and dissolve undesired by-products. The material is then washed extensively in order to obtain a fiber of higher dietary fiber content.

Although these prior processes can give an enriched fiber product, there is still need for a simple low-cost process for producing a product of high dietary fiber content from corn. We have now discovered a simple and economical process for enriching the dietary fiber content of corn fiber without the need for a chemical hydrolysis or for an expensive milling operation. By this process, the corn wet miller can convert a low-value by-product to a food component of much higher value.

SUMMARY OF THE INVENTION

In accordance with this invention, there is provided a process for producing an improved corn fiber product. This process comprises: passing the undried mixed fiber obtained from the corn wet-milling process through a sifter; separating a coarse fiber fraction which does not pass through the screen in the sifter; passing the coarse fiber fraction through a roller mill fitted with corrugated rolls operating at different speeds; passing the coarse fiber fraction exiting from the roller mill through a sifter; and separating a coarse fiber fraction which does not pass through the screen in the sifter, thereby, obtaining a corn fiber of high dietary fiber content.

Also provided, in accordance with this invention, is a process for producing an improved corn fiber product which comprises passing the undried mixed fiber obtained from the corn wet-milling process through a sifter; separating a coarse fiber fraction which does not pass through the screen of the sifter; and drying said coarse fiber fraction, thereby, obtaining a corn fiber of higher dietary fiber content than that of the mixed fiber obtained from the corn wet-milling process.

DETAILED DESCRIPTION OF THE INVENTION

The starting material used in the process of this invention is the mixed fiber stream obtained from the corn wet-milling process. This is readily available raw material produced in large quantities as a by-product of starch production by the wet-milling of corn. For a discussion of the industrial corn wet-milling process, see *Starch Chemistry and Technology*, Whistler and Paschall, Editors, Vol. II, Chapter 1, pp. 1–51, Academic Press, N.Y. (1967). The fiber produced by this process is washed and squeezed or filtered to reduce the content of free moisture to about 50 to 60% by weight. In the past, this by-product has generally been mixed with other by-products of the milling process and dried for use as animal feed.

The undried mixed fiber stream, having a moisture content of from about 40% to about 60% by weight, preferably, from about 50% to about 58% by weight, is suitable for use as the raw material in the process of this invention. Surprisingly, when the undried fiber with this range of moisture content is screened through a sifter, with screens having openings in a suitable size range, the coarse material which does not pass through the screens has a much higher dietary fiber content than does the fine material which passes through the screens. This provides a simple and economical method for separating a corn fiber product of higher dietary fiber content.

In contrast, if the mixed fiber stream is first dried before it is screened, much less enrichment of the dietary fiber fraction is observed in this screening operation.

Various screening devices used in the grain milling industry can be used in the process of the present application. One such suitable device is a rotary sifter. Such sifters may be fitted with screens of various size openings. Useful screens are those having U.S. Standard Sieve sizes from No. 5 to No. 10 (i.e., sieve openings of 2 mm to 4 mm).

When the sifter is used to separate the undried mixed corn fiber, satisfactory operation of the sifter depends not only on the screen size used in the sifter but also on the rate at which the undried corn fiber is passed through the equipment. When using a rotary sifter of 28 cm diameter and 76 cm length, with screens having U.S. Standard Sieve sizes from Nos. 5 to 10, a suitable supply rate is from about 225 kg per hour to about 900 kg per hour.

As noted in the examples, the use of a sifter produces a corn fiber of greatly enriched total dietary fiber content. Such product is then dried and either used as is or ground to a needed size for a particular food product.

In the event a product of even higher total dietary fiber content is desired, the coarse fiber fraction, which does not pass through the screen in the sifter, is passed without drying through a roller mill fitted with corrugated rolls operating at different speeds. Such roller mills are well known in the grain milling industry. Various corrugating configurations can be used on the rolls. It is generally desirable to operate the roll corrugations in a dull-to-dull configuration to maximize the yield of dietary fiber. The rolls are conveniently operated at gaps from about 0.10 mm to about 1.5 mm, respectively, and a roll speed differential of 1.1:1 to 2:1 may be used.

In the roller milling process, the material may be passed between the rolls more than one time. As noted in the examples, multiple passes between the rolls give a product with even higher dietary fiber content.

The product exiting from the roller milling machine is again passed through a sifter, and the coarse fiber fraction which does not pass through the screen of the sifter is separated and dried in the same manner as was done when the process was carried out without the use of the roller milling machine.

One advantage of the process of this invention is that it can be run in a continuous mode. In addition, it uses simple equipment which can be readily adjusted to give products of desired total dietary fiber content. A further advantage of the process is that it is sufficiently flexible so it can use mixed corn fiber streams of variable composition and yet produce a uniform product of a desired composition.

As can be seen from the following examples, the dietary fiber content of the coarse fiber fraction produced by this process is much greater than that of the starting material. In contrast, the fine fiber fraction which passes through the screen in the rotary sifter has a comparatively high starch, fat, and protein content. This material, which may be considered a by-product of the present process, is of value as an enriched animal feed component. Alternatively, the fine fiber fraction can be returned to the wet-milling process for further recovery of starch and protein. A further use for the fine fiber fraction is as a basic material for expandable (puffed) snack food items.

The following examples further illustrate the present invention and will enable others skilled in the art to understand it more completely. It should be understood, however, that the invention is not limited solely to the examples given below. In the examples, all percentages given are on a weight basis. The total dietary fiber values were determined by the method of Prosky, et al, *J. Assoc. Off. Anal. Chem.*, 67, 1044-1051 (1984). They represent the material remaining after the removal of starch, protein, fat, and ash from a given sample.

EXAMPLE 1

Separate portions of the undried mixed fiber stream, as discharged directly from a corn wet-milling plant, were used in the runs described in this example. This material typically analyzes 50-57% moisture, 50-60% d.b. (dry basis) dietary fiber, 26-32% d.b. starch, and 11-14% d.b. protein. The material was passed through a Powtek rotary sifter, Model P/11 X 30, available from S. Howes Company, Inc., Silver Creek, N.Y., using various screen sizes and various rates of supply to the sifter. The coarse fiber fraction which did not pass through the screen was analyzed for total dietary fiber content. The results of the various runs are given in Table I. They demonstrate that when the undried mixed fiber stream from The corn wet-milling process is subjected to the process of this invention, a coarse corn fiber fraction is obtained with a much higher dietary fiber content than that of the mixed fiber from the corn wet-milling process used as the raw material. These results also demonstrate that the amount of total dietary fiber in the coarse fiber fraction can be controlled by varying the mesh size of the screen and the rate at which the undried mixed fiber is supplied.

TABLE I

CORN FIBER SEPARATION BY ROTARY SIFTER

| Run No. | Sieve Size Opening (mm) | Undried Mixed Fiber Supply Rate (kg/hr) | Coarse Fiber Fraction Product Rate (kg/hr) | Total Dietary Fiber (% d.b.) |
|---|---|---|---|---|
| 1 | 3.36 | 230 | 48 | 85.2 |
| 2 | 3.36 | 318 | 66 | 84.5 |
| 3 | 3.36 | 431 | 102 | 85.6 |
| 4 | 3.36 | 599 | 195 | 83.7 |
| 5 | 3.36 | 953 | 288 | 82.2 |
| 6 | 2.83 | 327 | 91 | 82.8 |
| 7 | 2.83 | 424 | 127 | 80.6 |
| 8 | 2.83 | 621 | 191 | 80.4 |
| 9 | 2.83 | 737 | 243 | 78.5 |
| 10 | 2.38 | 408 | 163 | 81.7 |
| 11 | 2.38 | 553 | 277 | 78.6 |
| 12 | 2.38 | 812 | 406 | 80.2 |
| 13 | 2.38 | 1025 | 481 | 73.0 |

EXAMPLE 2

The general procedure of Example 1 was repeated using an 8-mesh U.S. Standard Sieve size screen (2.38 mm opening). The coarse fiber fraction which did not pass through the screen in the rotary sifter was then passed between the rolls in a single-pass roller mill, using an 18-inch diameter flaking roll in which the rolls were corrugated with a Stevens cut at 30 corrugations per inch (11.8 corrugations per cm). The roller mill used was a Ferrell-Ross mill, available from Blount Industrial Products, Bluffton, Indiana. The coarse fiber fraction exiting from the roller mill was again passed through the rotary sifter as was done in Example 1. The coarse fiber fraction which did not pass through the screen in the rotary sifter was separated and analyzed. Results of the tests given in Table II show that the material which passed through the roller mill has higher dietary fiber and less starch and protein than does the material coming from the first rotary sifter.

TABLE II

CORN FIBER SEPARATION BY ROTARY SIFTER AND ROLLER MILL

| | Total Dietary Fiber (% d.b.) | Starch[a] (% d.b.) | Protein[b] (% d.b.) |
|---|---|---|---|
| Mixed Corn Fiber (Average Value) | 55 | 30 | 12 |
| Coarse Fiber Fraction[c] | | | |
| From Rotary Sifter (2.38 mm Sieve Opening) | 73.7 | 17.6 | 8.3 |
| After Roller Milling (0.25 mm Roll Gap) and Rotary Sifting | 84.4 | 11.4 | 6.6 |
| After Roller Milling (0.20 mm Roll Gap) and Rotary Sifting | 86.9 | 9.6 | 6.2 |

[a] Starch was determined polarimetrically after dissolving in aqueous $CaCl_2$.
[b] Protein was calculated from Kjeldahl nitrogen values.
[c] The fine fiber fraction which passed through the screen in the rotary sifter contained on a dry substance basis: 38.1% total dietary fiber, 41.5% starch, and 14.9% protein.

EXAMPLE 3

The general procedure of Example 2 was followed except that the coarse fiber fraction was passed twice between rolls set at a 0.20-mm roll gap and the speed differential of the rolls maintained at a ratio of 1.5:1. The coarse fiber coming from the rolls was again passed through the rotary sifter as was done in Example 1. The coarse fiber fraction which did not pass through the screen contained on a dry substance basis: 89.9% total dietary fiber, 9.1% starch, and 6.0% protein. These results domonstrate that passage of the coarse fiber fraction between two sets of rolls gives material with even higher dietary fiber and less starch and protein than the material which is passed between one set of rolls.

Thus, it is apparent that there has been provided, in accordance with the invention, a process for producing a high total dietary corn fiber that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. A process for producing an improved corn fiber product of high dietary fiber content from the undried mixed fiber obtained from a corn wet-milling process which comprises:
   (a) passing the undried mixed fiber obtained from the corn wet-milling process through a sifter fitted with a screen;
   (b) separating a coarse fiber fraction which does not pass through the screen in the sifter;
   (c) passing the coarse fiber fraction through a roller mill fitted with corrugated rolls operating at different speeds;
   (d) passing the coarse fiber fraction exiting from the roller mill of Step (c) through a sifter fitted with a screen; and
   (e) separating a coarse fiber fraction which does not pass through the screen in the sifter in Step (d), thereby, obtaining a corn fiber of high dietary fiber content.

2. The process of claim 1 wherein the undried mixed fiber has a moisture content of from about 40% to about 60% by weight.

3. The process of claim 1 wherein the sifter used in Steps (a) and (d) is fitted with a screen having openings from about 2.0 to about 4.0 mm.

4. The process of claim 1 wherein the roller mill used in Step (c) is fitted with rolls operating at a roll speed differential of about 1.1:1 to 2:1 and roll gap of from about 0.10 mm to about 1.5 mm.

5. The process of claim 1 wherein the roller mill is a multiple roller milling machine.

6. A process for producing an improved corn fiber product of high dietary fiber content from the undried mixed fiber obtained from a corn wet-milling process which comprises:
   (a) passing the undried mixed fiber obtained from the corn wet-milling process through a sifter fitted with a screen;
   (b) separating a coarse fiber fraction which does not pass through the screen in the sifter; and
   (c) drying said coarse fiber fraction, thereby, obtaining a corn fiber of higher dietary fiber content than that of the mixed fiber obtained from the corn wet-milling process.

7. The process of claim 6 wherein the undried mixed fiber has a moisture content of from about 40% to about 60% by weight.

8. The process of claim 6 wherein the sifter used in Steps (a) and (d) is fitted with a screen having openings from about 2.0 to about 4.0 mm.

* * * * *